United States Patent
Kobayashi et al.

(10) Patent No.: US 10,967,517 B2
(45) Date of Patent: Apr. 6, 2021

(54) INFORMATION PROCESSING APPARATUS, METHOD, AND STORAGE MEDIUM FOR PRESENTING INFORMATION FOR CALIBRATION

(71) Applicant: CANON KABUSHIKI KAISHA, Tokyo (JP)

(72) Inventors: Kazuhiko Kobayashi, Yokohama (JP); Masahiro Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 324 days.

(21) Appl. No.: 15/818,416

(22) Filed: Nov. 20, 2017

(65) Prior Publication Data
US 2018/0147726 A1  May 31, 2018

(30) Foreign Application Priority Data
Nov. 28, 2016 (JP) .............................. JP2016-230329

(51) Int. Cl.
*B25J 9/16* (2006.01)
*G06K 9/62* (2006.01)
*G06T 7/80* (2017.01)

(52) U.S. Cl.
CPC .......... *B25J 9/1692* (2013.01); *B25J 9/1687* (2013.01); *B25J 9/1697* (2013.01); *G06K 9/6215* (2013.01); *G06T 7/80* (2017.01)

(58) Field of Classification Search
CPC ...... B25J 9/1692; B25J 9/1687; B25J 9/1697; G06T 7/80; G06K 9/6215
See application file for complete search history.

(56) References Cited

U.S. PATENT DOCUMENTS

| | | | |
|---|---|---|---|
| 6,681,151 B1* | 1/2004 | Weinzimmer | B25J 9/1697 219/121.85 |
| 9,734,419 B1* | 8/2017 | Ye | G06T 7/85 |
| 2006/0088203 A1* | 4/2006 | Boca | G06K 9/32 382/153 |
| 2011/0280472 A1* | 11/2011 | Wallack | G06T 7/80 382/153 |
| 2014/0240520 A1* | 8/2014 | Liu | H04N 5/225 348/187 |
| 2016/0184995 A1* | 6/2016 | Uchiyama | B25J 9/1692 700/259 |

FOREIGN PATENT DOCUMENTS

JP  2000-350239 A  12/2000

* cited by examiner

*Primary Examiner* — Stephen Holwerda
(74) *Attorney, Agent, or Firm* — Canon U.S.A., Inc. IP Division (57) ABSTRACT

An information processing apparatus includes a first generation unit configured to generate deviation data for each of parameters of respective apparatuses relating to three-dimensional measurement, a second generation unit configured to generate deviation data based on a captured image of a target acquired using the parameters and a registration image of the target, an acquiring unit configured to acquire similarity between the deviation data generated by the second generation unit and the deviation data for each of the parameters generated by the first generation unit, and a presentation unit configured to present presentation information relating to calibration of the parameters based on the similarity.

10 Claims, 5 Drawing Sheets

INFORMATION PROCESSING APPARATUS, METHOD, AND STORAGE MEDIUM FOR PRESENTING INFORMATION FOR CALIBRATION

BACKGROUND

Field of the Disclosure

The present disclosure generally relates to parameter calibration and, more particularly, to an information processing apparatus, a method and a storage medium for presenting information for calibration.

Description of the Related Art

In the basic technology of three-dimensional image measurement, a pattern light projected from a projector is reflected by a surface of a measurement target object, and a camera picks up an image of the reflected light. Further, an information processing apparatus calculates a distance from the camera to the measurement target object based on the principle of a triangulation method. At this time, a plurality of parameters such as a position of a principle point of an image sensing surface of the camera, a distance to a focal surface of a lens, distortion coefficients of the lens, and a position and attitude of an origin of the camera are used to calculate the distance.

These parameters are estimated by the image processing apparatus and the like in calibration. For example, a focal length, the position of the principle point, and the distortion coefficients of the lens that are intrinsic parameters of the camera are determined by a calibration technology discussed in Japanese Patent Application Laid-Open No. 2000-350239.

The parameters are varied due to, for example, oscillation of the apparatus, variation with time, or contact to the apparatus during operation adjustment. The calibration is done at this time, but there is no method of easily identifying parameters for calibration.

SUMMARY

According to one or more aspects of the present disclosure, an information processing apparatus includes a first generation unit configured to generate deviation data for each of parameters of respective apparatuses relating to three-dimensional measurement, a second generation unit configured to generate deviation data based on a captured image of a target acquired using the parameters and a registration image of the target, an acquiring unit configured to acquire similarity between the deviation data generated by the second generation unit and the deviation data for each of the parameters generated by the first generation unit, and a presentation unit configured to present presentation information relating to calibration of the parameters based on the similarity.

Further features of the present disclosure will become apparent from the following description of exemplary embodiments with reference to the attached drawings.

DESCRIPTION OF THE EMBODIMENTS

Exemplary embodiments of the present disclosure are described below with reference to the drawings.

Figure 1:
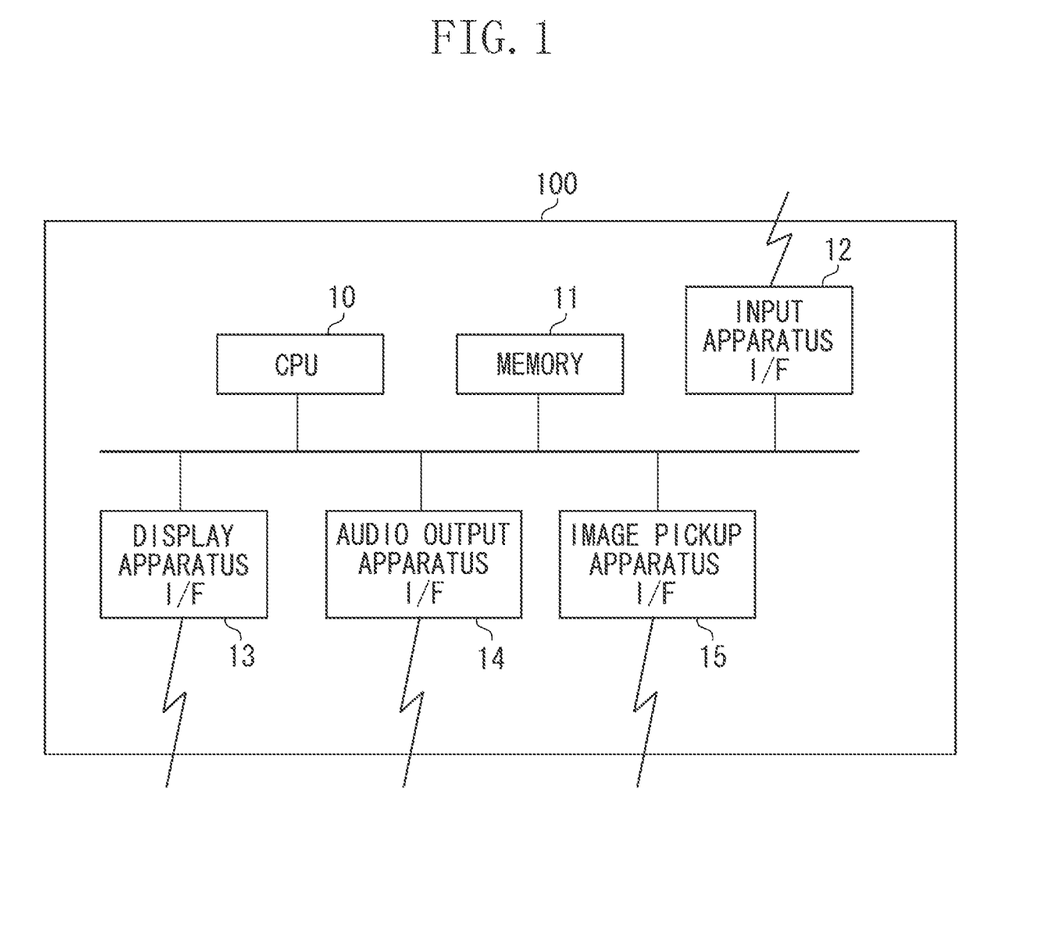
FIG. 1 is diagram illustrating an example of a hardware configuration of an information processing apparatus according to one or more aspects of the present disclosure.

A first exemplary embodiment is described. FIG. 1 is a diagram illustrating an example of a hardware configuration of an information processing apparatus 100 according to one or more aspects of the present disclosure.

The information processing apparatus 100 includes, as a hardware configuration, a central processing unit (CPU) 10, a memory 11, an input apparatus interface (I/F) 12, a display apparatus I/F 13, an audio output apparatus I/F 14, and an image pickup apparatus I/F 15.

The CPU 10, which may include one or more memories, one or more processors, circuitry, or a combination thereof, may control the entire information processing apparatus 100. The memory 11 stores data for processing of the first exemplary embodiment described below, such as instructions, a program, an image, a parameter, or the like. The input apparatus I/F 12 is an interface that connects an input apparatus to the information processing apparatus 100. Examples of the input apparatus include a mouse described below. The display apparatus I/F 13 is an interface that connects a display apparatus to the information processing apparatus 100. Examples of the display apparatus include a display described below. The audio output apparatus I/F 14 is an interface that connects an audio output apparatus to the information processing apparatus 100. Examples of the audio output apparatus include a speaker described below. The image pickup apparatus I/F 15 is an interface that connects an image pickup apparatus to the information processing apparatus 100. Examples of the image pickup apparatus include a camera described below.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Figure 2:
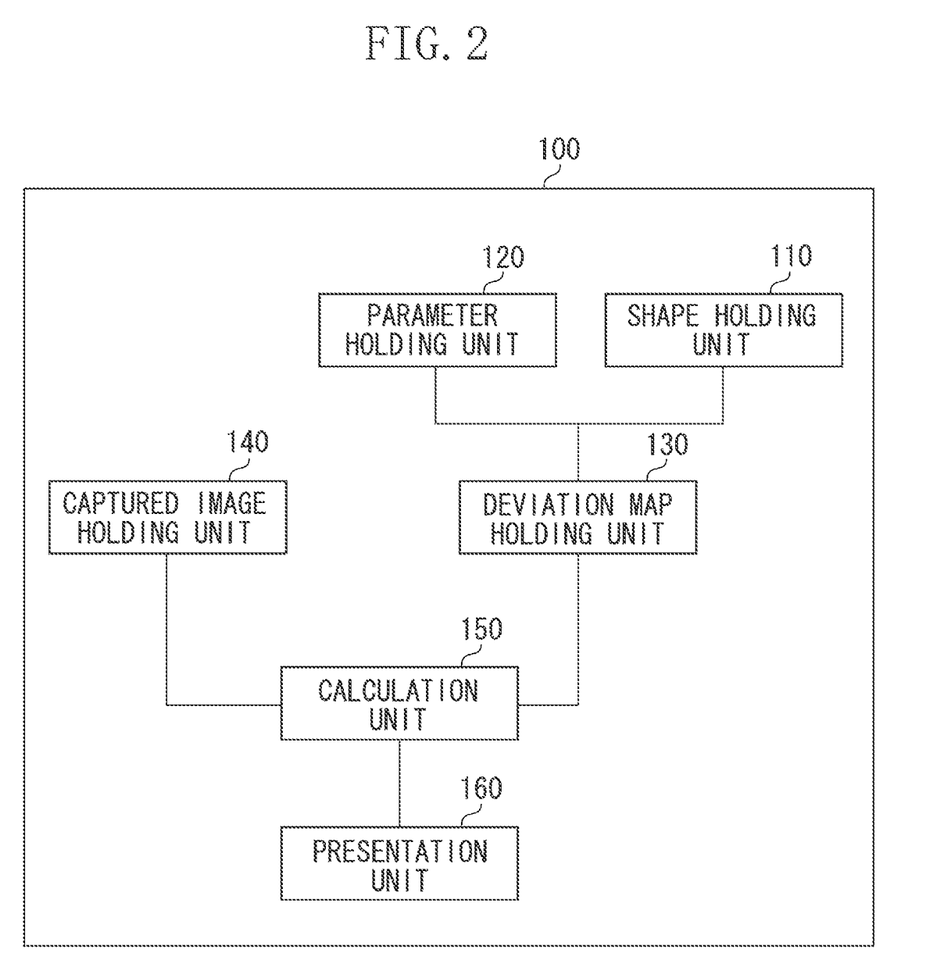
FIG. 2 is a diagram illustrating an example of a functional configuration of the information processing apparatus according to one or more aspects of the present disclosure.
Figure 4A:
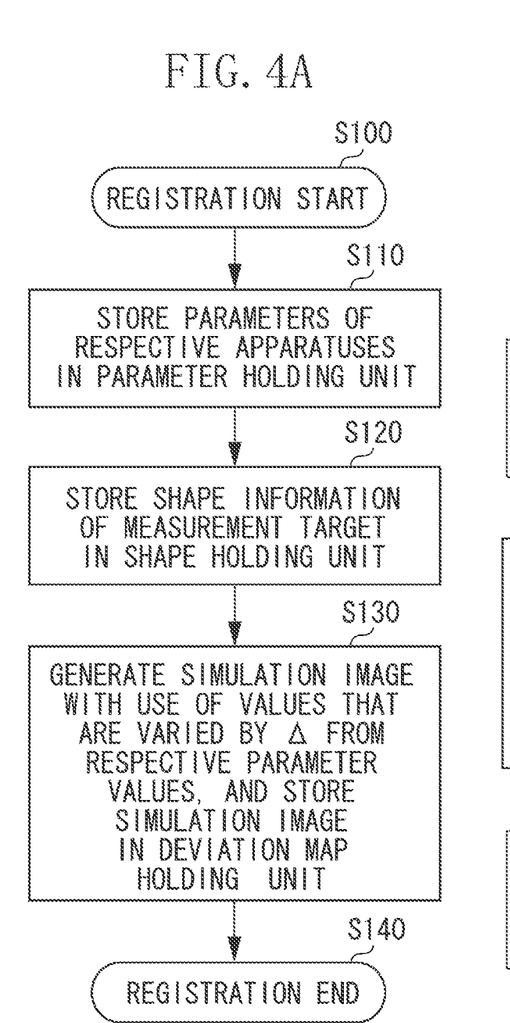
FIGS. 4A and 4B are flowcharts illustrating an example of information processing according to one or more aspects of the present disclosure.
Figure 4B:
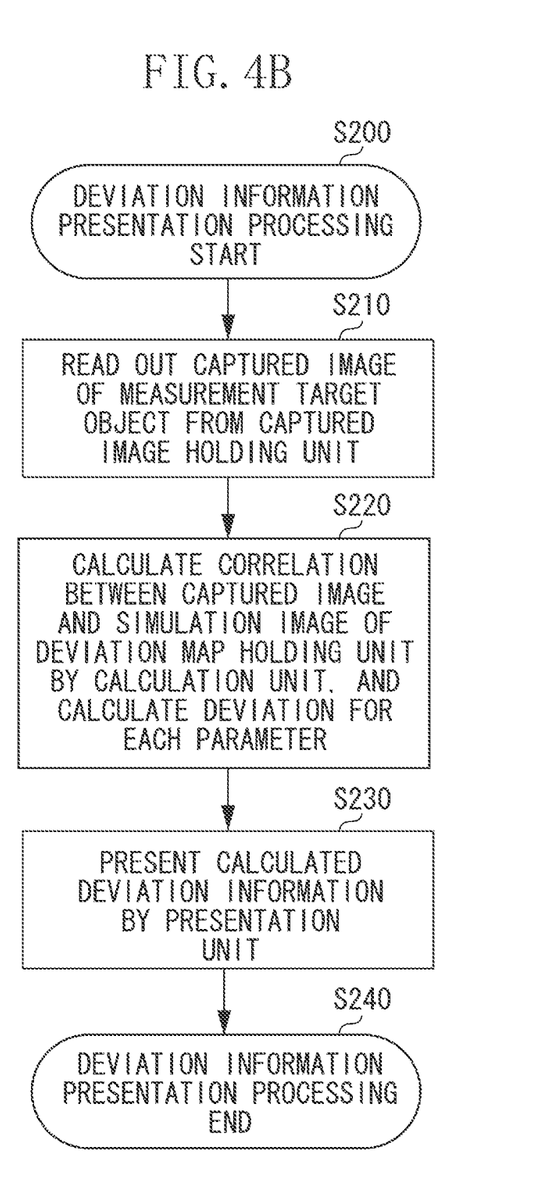

The CPU 10 executes processing based on instructions or a program stored by the memory 11, which realizes a functional configuration of the information processing apparatus 100 illustrated in FIG. 2, processing of flowcharts illustrated in FIGS. 4A and 4B, and the like.

The information processing apparatus 100 presents deviation of parameters from parameters at the time of calibration with regard to respective measurement apparatuses of a three-dimensional measurement system. The three-dimensional measurement system measures a position and attitude of a target object using an image. The information processing apparatus 100 generates a range image using values that are obtained by adding (or subtracting) a slight value within a linear approximation range to each of the parameters relating to three-dimensional measurement. The information processing apparatus 100 also generates a range image using normal parameter values not subjected to addition or subtraction. The information processing apparatus 100 generates, as a deviation map, two-dimensional deviation for each of the parameters associated with variation, based on the range image generated with the normal parameters and the range image generated with the added or subtracted parameters, and retains the deviation map. An image, that is measured while the measurement apparatus or the like is deviated, is slightly deviated from an image in a correctly-calibrated state (a registration image), and the deviation range is linearly approximated. When the deviation range can be approximated, the information processing apparatus 100 calculates correlation between the deviation map previously calculated for each of the parameters and the deviation map generated from the measured captured image and the registration image, thereby estimating that the parameter having large correlation is deviated. The information processing apparatus 100 performs such estimation and presentation, which allows a user to acquire information that identifies how which parameter of which apparatus is deviated, among the measurement apparatuses such as a camera and a projector of the three-dimensional measurement system. As a result, for example, it is possible to reduce a time for recalibration and failure recovery of the measurement apparatuses. The deviation map is an example of deviation data. The functional configuration of the information processing apparatus 100 is described in detail with reference to FIG. 2.

A shape holding unit 110 holds a shape of a measurement target object in the memory 11. In this example, the shape is a position of a surface of a target object observed through the camera of the three-dimensional system, and it is sufficient for the shape to describe a surface shape of a polygon model or a design CAD (computer aided design) model as a shape model of the target object. Alternatively, a group of points that are obtained by three-dimensionally measuring the surface of the object fixed in a measurement environment may be used for the shape.

A parameter holding unit 120 holds, in the memory 11, parameters relating to an optical image pickup device used in the three-dimensional measurement. The parameters include a lens focal length, a position of a principle point, and coefficients of radial direction distortion and circumferential direction distortion as lens distortion. The parameters may further include parameters for a triangulation method, such as a position of a principle point of the image pickup device, a position and attitude of an origin of a camera coordinate system with respect to a measurement space, a relative position and attitude between the camera and the projector, and a baseline. Further, in a case where a robot is used, the parameters include a relative position and attitude between an origin of a robot coordinate system and the origin of the camera coordinate system, and a relative position and attitude between an origin of a workspace coordinate system and the origin of the camera coordinate system. The origin of the workspace coordinate system indicates a working origin of a workbench. In a state where the measurement apparatuses are placed in an actual measurement space, the parameters may be calibrated due to a measurement range or layout relationship with peripheral devices. It is sufficient for the information processing apparatus 100 to calibrate parameters that may vary among the plurality of parameters. In addition, when all of the parameters are regarded as the calibration targets, the information processing apparatus 100 can detect, as a failure of the device, for example, deformation of a fixed portion caused by external force. The information processing apparatus 100 holds, by the parameter holding unit 120, parameter values that have been once calibrated together with correspondence with the measurement apparatuses.

A deviation map holding unit 130 uses shape information in the shape holding unit 110 and the parameters relating to the three-dimensional measurement in the parameter holding unit 120, to hold, in the memory 11, the deviation map for each of the parameters and the range image in the correctly-calibrated state. The information processing apparatus 100 sets a value that is obtained by adding a slight value to a parameter of interest among the parameters, and does not change the other parameters. The information processing apparatus 100 calculates a difference between the range image generated together with the parameter and the range image that is calculated with no change of the parameters. If the parameter values are different from each other, a range value that is slightly different from an ideal range value is calculated. Such difference of the range value differently appears depending on a part of the range image. For example, in a case of the deviation in the X direction, the deviation appears in the X direction. In the information processing of the first exemplary embodiment, the deviation map when one of the parameters is slightly varied is prepared to previously calculate image Jacobian as a state of the image. Accordingly, the captured image that is measured while the measurement apparatus is deviated is slightly deviated from the image (the registration image) in the correctly-calibrated state. The information processing apparatus 100 can estimate that which parameter is largely deviated using the correlation with the deviation map when the deviation range can be linearly approximated.

A captured image holding unit 140 holds a range image three-dimensionally measured and a captured image in the memory 11. In the first exemplary embodiment, the range image is obtained through range image measurement by a space encoding method using the camera and the projector. The projector projects a plurality of image patterns by the space coding method with a gray code in such a manner that positions of the respective image patterns projected by the projector can be specified. The image processing apparatus 100 decodes the gray code, thereby specifying the positions of the respective projected image patterns. At this time, the information processing apparatus 100 uses the parameters of the lens and the camera held by the parameter holding unit 120.

A calculation unit 150 calculates, as the deviation map, a difference of each pixel between the range image (the registration image) previously registered at the time of calibration and the range image, held by the captured image holding unit 140, at the time when the apparatus is deviated. Further, the calculation unit 150 calculates correlation between the calculated deviation map and the deviation map for each of the parameters held by the deviation map holding unit 130, through calculation of an inner product of two pixel values or a cumulative value of the square sum of the values. The calculation unit 150 stores, as a list, the correlation values of the respective parameters (deviation map similarity calculation results) in the memory 11.

Figure 3:
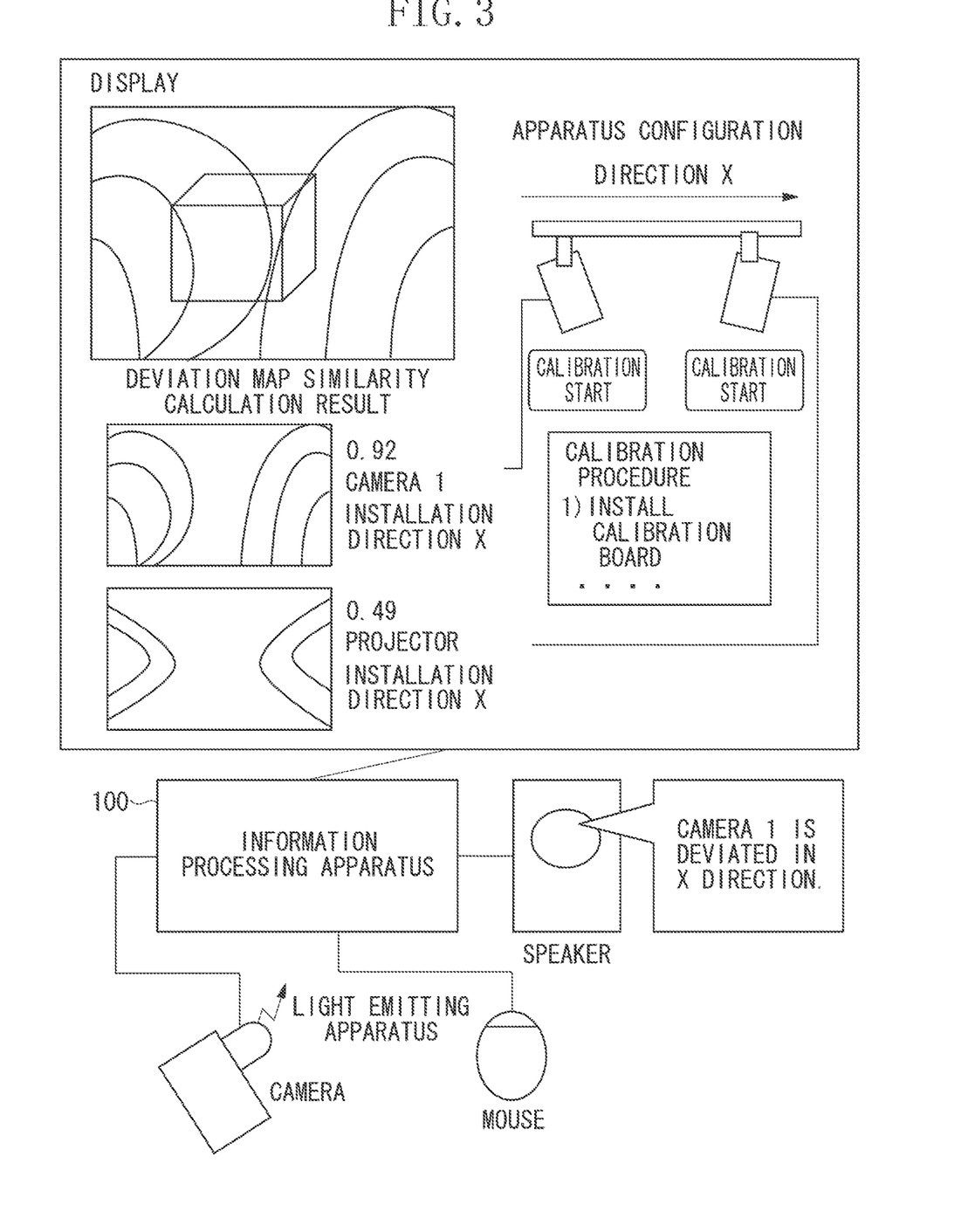
FIG. 3 is a diagram illustrating an example of presentation on a display according to one or more aspects of the present disclosure.

A presentation unit 160 uses the list of the correlation values of the respective parameters calculated by the calculation unit 150 to present the parameters held by the parameter holding unit 120, together with relevance with the measurement apparatuses of the three-dimensional measurement system. The presentation unit 160 performs presentation using the display, for example. FIG. 3 is a diagram illustrating an example of the presentation on the display by the presentation unit 160. The presentation unit 160 may perform presentation to the user by using graphical user interface (GUI) elements such as a character string, a graph, a color, and a graphic. Further, the presentation unit 160 may read aloud the information relating to the calculated correlation values using a speaker through speech synthesis. Moreover, the presentation unit 160 may use a light emitting device such as a light-emitting diode (LED) provided in each of the measurement apparatuses of the three-dimensional measurement system, and causes the LED of the apparatus having a large parameter deviation to emit a light, thereby performing presentation to the user.

In addition, the information processing apparatus 100 may transmit a calibration instruction to the measurement apparatus of the three-dimensional measurement system presented by the presentation unit 160, based on a user operation through the input apparatus such as the mouse. This makes it possible to promptly start the calibration. A GUI of a "calibration start" button is displayed at a part that indicates an apparatus for calibration in the screen displayed on the display in FIG. 3. When the user clicks the button with the mouse, the information processing apparatus 100 actually starts the information processing relating to the calibration of the corresponding apparatus.

The information presented in FIG. 3 is an example of presentation information. The "calibration start" button is an example of an object that instructs start of the parameter calibration.

A flow of each processing unit is described with reference to FIGS. 4A and 4B.

FIG. 4A is a flowchart illustrating an example of information processing of registering, as reference information for deviation detection, the information of the parameters at the time when the calibration is completed.

In step S100, the information processing apparatus 100 starts the following registration processing after the calibration of each of the parameters is completed. A specific method depending on the configuration of each apparatus or a scheme may be executed to perform the calibration. If the parameter is not registered, it may not be possible to basically perform subsequent processes, and the registration operation may be performed one or more times.

In step S110, the parameter holding unit 120 stores the parameters of the respective measurement apparatuses of the three-dimensional measurement system in a predetermined region of the memory 11. The parameters may include items for calibration, such as a lens focal length, distortion coefficients, and the position of the principle point, and numerical values depending on the apparatus, such as the number of pixels and arrangement of color pixels. The parameters may further include a position and attitude relative to a reference coordinate system of the measurement environment. In step S110, the parameter holding unit 120 stores, in the predetermined region of the memory 11, the parameters to calculate a three-dimensional position of the measurement target. At this time, in a case where the plurality of measurement apparatuses each include a plurality of parameters, the parameter holding unit 120 may store the plurality of parameters in the memory 11 while associating the parameters with the measurement apparatuses. This facilitates identification of correspondence between cameras and parameters in a case where a plurality of cameras is used. When the calibrated values have been written in a file or a nonvolatile memory, the parameter holding unit 120 may read the calibrated values and store the calibrated values in the predetermined region of the memory 11. Moreover, the parameter holding unit 120 may input numerical values in response to an input operation by the user through a GUI displayed on the display. In a case where the parameters are managed by a network, the parameter holding unit 120 may acquire the parameters from a server and store the acquired parameters in the memory 11. Such a configuration allows for laborsaving in the input operation of the parameter values.

In step S120, the shape holding unit 110 holds the shape information of the measurement target in a predetermined region of the memory 11. The shape holding unit 110 may hold the shape information of the measurement target in a form of values X, Y, Z as three-dimensional information of a two-dimensional image form. Alternatively, the shape holding unit 110 may hold, as a list form, data of distance values corresponding to respective points on the screen that are obtained by randomly or discretely sampling the shape information of the measurement target. Since the calibration has been already completed in step S110, the shape holding unit 110 may acquire the range image from the measurement target that is disposed at a registration position, and holds distance points of the range image as the shape information in the memory 11. Further, when it is possible to capture an image of the measurement target object at the same time because of using the camera, the shape holding unit 110 may register the image and converts the image into three-dimensional positions through post-processing. In this case, the shape holding unit 110 may use other calibrated camera to calculate the distance value through a stereo method. In the processing of the first exemplary embodiment, as the deviation map is not limited to the points on the surface of the measurement target, the shape holding unit 110 may determine an intensity gradient of the captured image to determine a local feature amount or a distance to the pixel detected as an edge, thereby registering the local feature amount and the distance. In addition to the measurement target, the camera may capture an image of a target such as a jig and a pedestal fixed in the workspace, or may capture an image of a portion other than the measurement target. Further, the shape holding unit 110 may register these images. In a case of using a method in which information of the range image is used as it is, a setting of distance values is easily performed because the information of the range image is usable even if the shape information other than the target is not provided.

The position and attitude of the surface of the measurement target object in the camera coordinate system observed by the camera may be used as the shape information, besides the registered range image. In a case where a surface shape model of the measurement target such as a CAD model or a polygon model is usable, the shape holding unit 110 performs conversion of coordinates of each vertex such that the model coordinate system of a target model in the camera coordinate system is aligned to an observation position. This allows the shape holding unit 110 to acquire the coordinates of the surface of the measurement target in the camera coordinate system.

In step S130, the deviation map holding unit 130 holds the deviation map in a predetermined region of the memory 11. The deviation map is created from the range image when the values of the respective parameters held in step S110 are slightly varied and the range image when the values of the respective parameters are not varied.

In step S140, the series of registration processing ends.

FIG. 4B illustrates a flow of processing to detect which parameter among the parameters of the installation position of the measurement apparatus, the pocus position of the lens, and the like, is deviated with respect to the registration information.

In step S200, deviation information presentation processing starts. The processing in step S200 can start at the time when the system is activated or can start in response to an instruction through the GUI at an optional timing at which a user performs a check. In addition, the information processing apparatus 100 can detect a yield of the operation, and when a state that exceeds set fluctuation in a steady state is detected, the processing in step S200 can start. The processing according to the first exemplary embodiment presents whether any of the parameters relating to the respective measurement apparatuses of the three-dimensional measurement system is deviated. Therefore, if no parameter is deviated, the processing ends with no abnormality as a result even when the processing starts. Accordingly, the information processing apparatus 100 can periodically execute the following processing using a timer of the system.

In step S210, the calculation unit 150 reads out the captured image of the measurement target object from the memory 11 through the captured image holding unit 140, thereby preparing a target image to be checked. When the shape holding unit 110 uses the range image to hold the shape information in step S120 described in FIG. 4A, the measurement target same as the target in capturing such image may be disposed. In a case where a component is the measurement target, it is difficult to correctly dispose the component. However, information of a surface plate or a jig located on a background other than the component may be used while the component is removed. The surface plate or the jig may be disposed in a layout similar to the layout in the registration. In addition, the information processing apparatus 100 may store, as a file, periodically-captured images in the memory 11 or the like, and may read out the file of a target image as desired. This makes it possible to perform failure verification in a past state.

In step S220, the calculation unit 150 performs, for example, simulation using the captured image read in step S210 and the calibrated parameters and generates the deviation map with respect to the registered image (the registration image), to calculate correlation between the deviation map thus generated and the deviation map held by the deviation map holing unit 130 in step S130. To calculate the correlation, luminance information of the image is normalized, and luminance comparison of each pixel is performed. The deviation direction and the image that has been deviated in parameter in the same direction in advance may have high correlation. As the degree of the correlation is calculated as a numerical value, the calculation unit 150 holds the calculation result of the correlation with the deviation map for each of the parameters. The calculation unit 150 calculates an average value of the correlation values as deviation similarity. The higher value of the deviation similarity indicates that relevance with the corresponding deviation map is high. In this example, the method of calculating the correlation is described; however, any index can be basically used as long as the index can indicate similarity. The calculation unit 150 can calculate an image statics amount or feature of distribution, and determine the similarity using the moment of the distribution.

In step S230, the presentation unit 160 presents the information relating to deviation of the parameters based on the result calculated in step S220. In a case of presenting the parameters relating to the lens, it is sufficient for the presentation unit 160 to present deviation of the parameters of the lens in a form that allows for identification of the apparatus, such as a character, a picture, a figure, and a machine number. In addition, the presentation unit 160 sorts and presents the information in descending order of the degree of the correlation value, which allows the user to check the information in descending order of influence to the deviation. This makes it possible to drastically reduce labor for inspection and calibration. The information processing apparatus 100 can previously store, in the memory 11 and the like, information of a range of fluctuation such as oscillation of the apparatus in response to a setting operation of the user through the input apparatus, etc. In a case where the information of the fluctuation range is stored in the memory 11 or the like, and the fluctuation is within the range, the presentation unit 160 may not present the information of the parameter that corresponds to measurement noise of the apparatus. This makes it possible to narrow down an inspection target.

In step S240, the processing of presenting the information of the parameter deviation ends. In a case where the parameter is not deviated as a result of the processing, the information processing apparatus 100 can send back a non-abnormality state to repeat the inspection of the parameter deviation on a system schedule. As a result, the system makes it possible to regularly inspect whether the parameter is deviated. For example, the information processing apparatus 100 holds, in the memory 11, interval information of the schedule set by the user through the input apparatus. Then, the information processing apparatus 100 can execute the processing in FIG. 4B with the set interval, based on the setting information held by the memory 11.

The information processing according to the first exemplary embodiment makes it possible to rapidly grasp that which parameter is deviated in each of the measurement apparatuses of the three-dimensional measurement system, and to preferentially calibrate the measurement apparatus on which the failure occurs, thereby drastically reducing the time used for fault restoration.

Next, a second exemplary embodiment is described. In the calculation unit 150 in the first exemplary embodiment, the parameters are independent of one another, and the case where one of the parameters is deviated has been described. In a case where two or more parameters are deviated and the influence by the respective parameters are independent of one another, the calculation unit 150 can represent the influence of the parameter with linear combination. Further, the calculation unit 150 calculates a contribution rate to each deviation map using a multivariate analysis method, thereby calculating ratio of an influence when the plurality of parameters contributes to the deviation maps. In this case, as an example illustrated on the display in FIG. 3, the presentation unit 160 displays a plurality of parameter candidates together with respective specific numerical values of the contribution rate. As a result, it is possible to collectively calibrate the plurality of apparatuses at the same time depending on the influence range for the calibration, and to further reduce the labor of the user for the calibration.

In addition, the information processing apparatus 100 can allow the list of the correlation values of the respective parameters to be referred from a client of a network as with a web server, in addition to be presented on the display. This allows for check of the information of the parameter deviation from a remote location. As a result, it is possible to reduce a time to reach the apparatus.

There may be a case where the user may not grasp the procedure of the correction and the calibration because of inexperience. In this case, when the user selects, through the input apparatus and the like, the apparatus to be calibrated from the apparatuses presented by the presentation unit 160, the information processing apparatus 100 can present a specific procedure of the correction and the calibration in a manual format. This makes it possible to reduce mistakes and the like in the calibration procedure by the user. For example, the presentation unit 160 may display a page in which a figure and the procedure are described on a web browser. In addition, the presentation unit 160 may present the specific procedure with animation. Any information presentation formats may be used as long as the presentation allows the user to understand the procedure.

The deviated direction of the measurement apparatus configuring the three-dimensional measurement system is calculated using positive/negative values in the correlation calculation. The deviated direction is represented by a coordinate system depending on the apparatus. In view of this, for example, in a case of a camera disposed upside down, a correction direction of the camera is difficult to be understood because of the deviated direction is not intuitively coincident with an actual direction. Therefore, the calculation unit 150 converts the coordinate system of each disposed apparatus into a workspace coordinate system. The presentation unit 160 then presents the deviated direction in the workspace coordinate system to the user. This allows the user to intuitively grasp the correction direction to correct the deviation of the apparatus, which makes it possible to perform correction accurately and to reduce the execution time. Further, since the calculation unit 150 also calculates the deviation degree from the correlation values, it is possible to present a correction degree.

Figure 5:
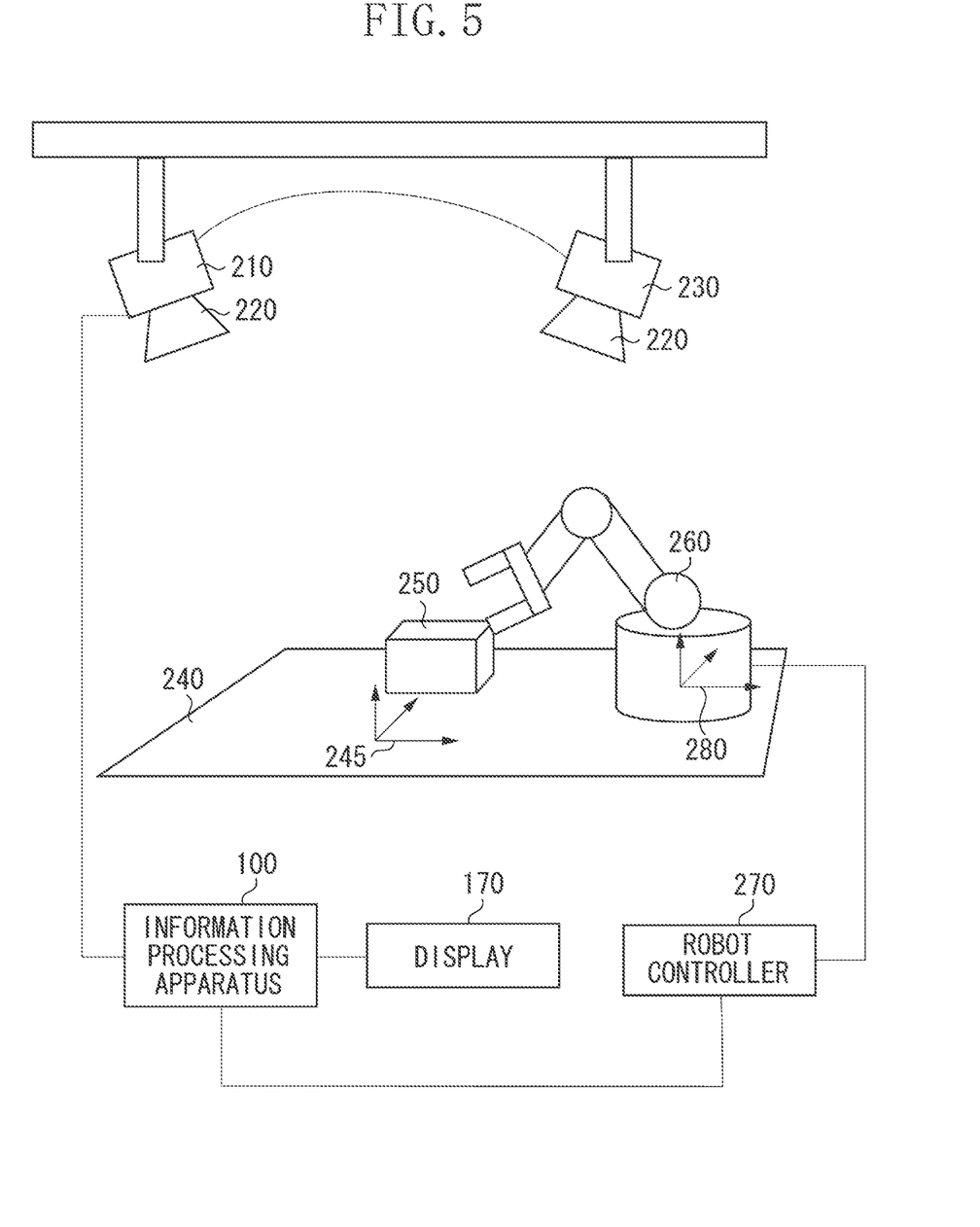
FIG. 5 is a diagram illustrating an example of a system configuration of a three-dimensional measurement system according to one or more aspects of the present disclosure.

FIG. 5 is a diagram illustrating an example of a system configuration of the three-dimensional measurement system. As illustrated in FIG. 5, the above-described processing of the exemplary embodiments is effective when the information processing apparatus 100 and a robot controller 270 are combined to perform an assembling process of a component. In FIG. 5, a camera and an installation parameter 210 thereof, a projector 220 and an installation parameter 230 thereof, and a robot 260 and an installation parameter 280 thereof are targets.

The information processing apparatus 100 registers, as the deviation map, information of a reference coordinate 245 in a workspace 240 and a calibration jig 250 on the workspace 240. The information processing apparatus 100 presents the state of the parameter using a display 170. In addition, the information processing apparatus 100 controls the robot 260 in order to perform parameter calibration using the robot controller 270. In a case of three-dimensional measurement of a machine vision used in bin picking or the like, the calibration board may be held by a hand of the robot 260 in some cases. In this case, it is possible to cause the robot 260 to pick up an image for the correction and the calibration even not by an operator. To perform robot calibration processing, the information processing apparatus 100 controls the robot controller 270 to move the robot 260 to a predetermined position, as an installation condition of the apparatus is held by the parameter holding unit 120. The information processing apparatus 100 then controls the robot controller 270 to correct deviation of the apparatus based on the information of the deviation direction and the deviation degree described above. After that, the robot 260 holds the calibration jig 250 and disposes the calibration jig 250 so as to be captured in a predetermined imaging direction a predetermined number of times, and then the calibration is performed. Actually, the user instructs an operation through the presentation unit 160 and the like in consideration of balance with other operations. This is effective to improve efficiency of the operation instruction. The robot controller 270 is an example of a control apparatus to control the robot.

Hereinbefore, the exemplary embodiments of the present disclosure are described in detail. However, the present disclosure is not limited to such specific exemplary embodiments. A portion or all of the functional configuration of the information processing apparatus 100 in FIG. 2 can be mounted as a hardware configuration on the information processing apparatus 100. Some or all of the holding units illustrated in FIG. 2 may not store the data and the like in the memory 11, and can store the data and the like in a predetermined memory of another apparatus that is communicable with the information processing apparatus 100.

According to the processing of the respective exemplary embodiments described above, it is possible to reduce labor for the parameter calibration. In addition, it is possible to easily limit a portion to be recalibrated by presenting the information such as the parameters relating to identification of difference cause to the user. Consequently, it is possible to drastically reduce a time to return the system to a normal system.

Other Embodiments

Embodiment(s) of the present disclosure can also be realized by a computerized configuration of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration may comprise one or more processors and one or more memories (e.g., central processing unit (CPU), micro processing unit (MPU)), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2016-230329, filed Nov. 28, 2016, which is hereby incorporated by reference herein in its entirety.

What is claimed is:

1. An information processing apparatus, comprising:
one or more processors; and
at least one memory storing executable instructions, which when executed by the one or more processors, cause the information processing apparatus to function as:
a first holding that holds a value of each of parameters in a parameter set related to a measurement apparatus that measures a three-dimensional shape, based on a first image of a predetermined object captured by the measurement apparatus;
a second holding that holds a plurality of first deviation maps by using each of the parameters by changing a value of a parameter of interest in the parameter set from the value of each of the parameters by a value smaller than a predetermined value;
an acquiring that acquires respective correlations between each of the first deviation maps and a second deviation map, the second deviation map being generated based on the first image and a second image of the predetermined object captured at timing later than timing at which the first image is captured; and
a presentation that outputs one or more parameters corresponding to the first deviation maps in descending order of the correlations with the second deviation map.

2. The information processing apparatus according to claim 1,
wherein the instructions cause the information processing apparatus to further act as the acquiring that acquires a similarity for each of the parameters between each of the first deviation maps and the second deviation map, as the correlation for each of the first deviation maps between the first deviation maps and the second deviation map, and
wherein the presentation outputs the similarity.

3. The information processing apparatus according to claim 1, wherein the presentation outputs a direction of deviation of each of the parameters based on the first deviation maps.

4. The information processing apparatus according to claim 1, wherein the presentation outputs information to calibrate the parameter in which deviation is generated from the value of each of the parameters held by the holding.

5. The information processing apparatus according to claim 1, wherein the presentation displays image data including one or more parameters of which values are deviated from the value of each of the parameters held by the holding.

6. The information processing apparatus according to claim 5, wherein the instructions cause the information processing apparatus to further act as a processing, and wherein the image data further includes a predetermined image for issuing an instruction of calibration start of each parameter, and
the processing starts processing relating to the calibration of each parameter with respect to the apparatus when the predetermined image is selected.

7. The information processing apparatus according to claim 1, wherein the second deviation map is generated by simulation.

8. An information processing method executed by an information processing apparatus, the method comprising:
holding a value of each of parameters in a parameter set related to a measurement apparatus that measures a three-dimensional shape, based on a first image of a predetermined object captured by the measurement apparatus;
holding a plurality of first deviation maps by using each of the parameters by changing a value of a parameter of interest in the parameter set from the value of each of the parameters by a value smaller than a predetermined value;
acquiring respective correlations between each of the first deviation maps and a second deviation map, and the second deviation map being generated based on the first image and a second image of the predetermined object captured at timing later than timing at which the first image is captured; and
outputting one or more parameters corresponding to the first deviation maps in descending order of the correlations with the second deviation map.

9. A non-transitory computer-readable storage medium storing a program to cause a computer to execute a method comprising:
holding a value of each of parameters in a parameter set related to a measurement apparatus that measures a three-dimensional shape, based on a first image of a predetermined object captured by the measurement apparatus;
holding a plurality of first deviation maps by using each of the parameters by changing a value of a parameter of interest in the parameter set from the value of each of the parameters by a value smaller than a predetermined value;
acquiring respective correlations between each of the first deviation maps and a second deviation map, and the second deviation map being generated based on the first image and a second image of the predetermined object captured at timing later than timing at which the first image is captured; and
outputting one or more parameters corresponding to the first deviation maps in descending order of the correlations with the second deviation map.

10. An information processing apparatus comprising:
one or more processors; and
at least one memory storing executable instructions, which when executed by the one or more processors, cause the information processing apparatus to function as:
a determination that determines calibrated values of each parameter in a parameter set related to a measurement apparatus which measures three-dimensional shape, based on a first image of a predetermined object captured by the measurement apparatus;
a generation that generates first deviation maps, based on a state in which a value of a parameter of interest among the parameters set is changed from the calibrated value by a value smaller than a predetermined value;

a holding that holds a plurality of first deviation maps generated by the generation; and an output that outputs one or more parameters corresponding to the first deviation maps in descending order of correlations with the second deviation map to present whether deviation is generated in the value of the parameter of interest, based on the respective correlations between each of the first deviation maps and a second deviation map, the second deviation map being generated based on the first image and a second image of the predetermined object captured at a time later than a time at which the first image is captured.

* * * * *